Figure 1:
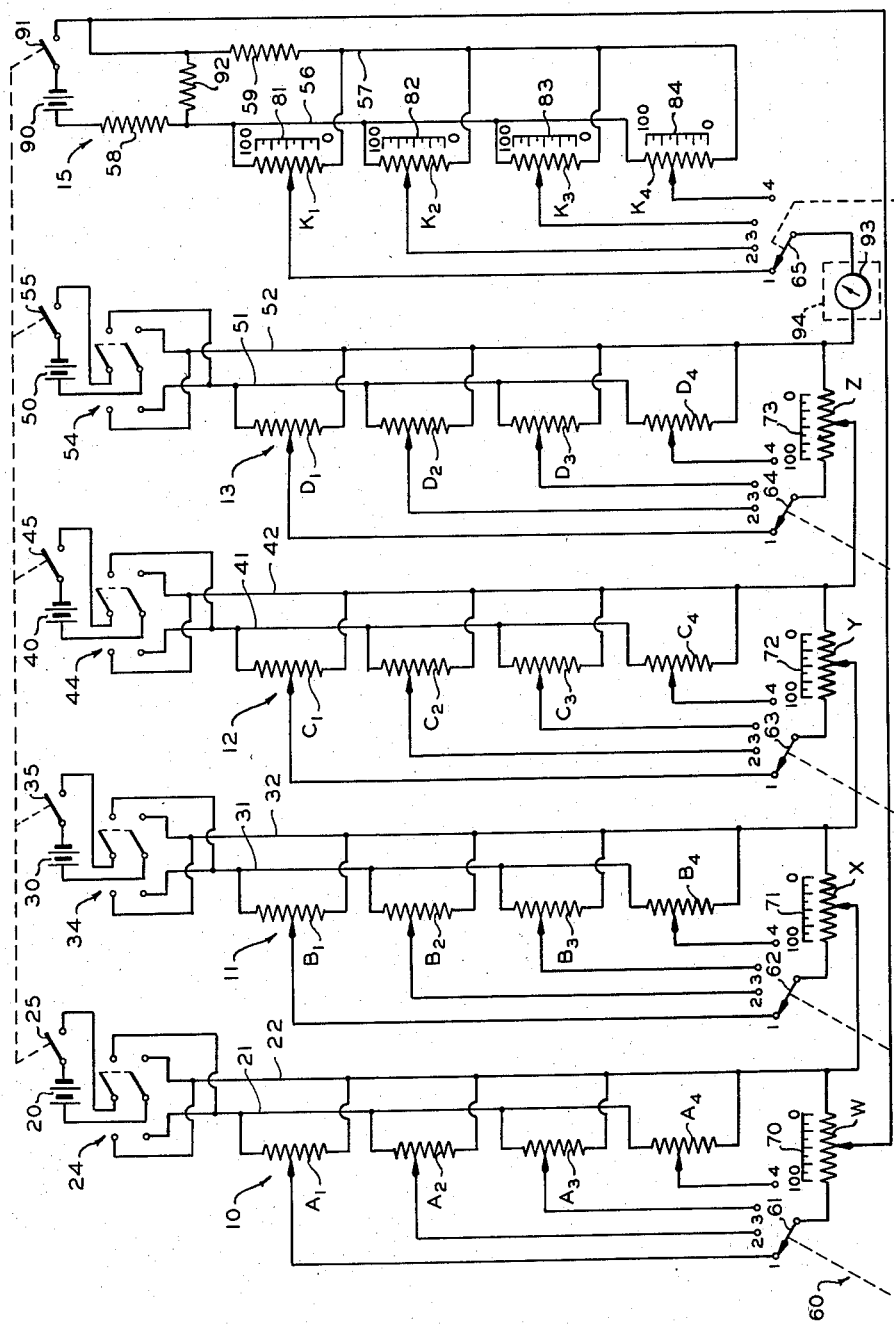

FIG. I.

INVENTOR.
G. T. PORTER

United States Patent Office 2,924,384
Patented Feb. 9, 1960

2,924,384
ELECTRICAL COMPUTER

Grady T. Porter, Bartlesville, Okla., assignor to Phillips Petroleum Company, a corporation of Delaware Application August 15, 1955, Serial No. 528,237

4 Claims. (Cl. 235—180)

This invention relates to apparatus for solving systems of simultaneous linear equations.

In many industrial operations there is a need for computers which are capable of solving systems of linear simultaneous equations. This is particularly true in the petroleum industry where analysis by infrared spectrophotometers has become a common procedure to determine percentages of the various constituents in mixtures. For example, if a four component mixture is to be analyzed, the procedure is to measure the total infrared absorption of the mixture at a first wave length $L_1$, this wave length being chosen to create as large an absorption as possible with respect to the first component of the mixture, as compared wtih the absorption caused by the remaining components. In a similar manner a second absorption value is measured for the sample at a second wave length $L_2$ which is chosen to cause as great an absorption as possible due to the second component of the mixture, as compared with the remaining components; and in like manner additional readings are taken at wave lengths $L_3$ and $L_4$. Because the total absorption by the mixture at any wave length must be equal to the sum of the absorptions brought about by each of the components of the mixture, a set of equations can be written as follows:

$$a_1w+b_1x+c_1y+d_1z=k_1$$
$$a_2w+b_2x+c_2y+d_2z=k_2$$
$$a_3w+b_3x+c_3y+d_3z=k_3$$
$$a_4w+b_4x+c_4y+d_4z=k_4$$

(1)

In these equations $w$, $x$, $y$, and $z$ are the percents of the respective components of the mixtures; $a_1$, $a_2$, $a_3$ and $a_4$ are the absorption coefficients for component $w$ at wave lengths $L_1$, $L_2$, $L_3$ and $L_4$, respectively; $b_1$, $b_2$, $b_3$ and $b_4$ are the absorption coefficients for component $x$ at wave lengths $L_1$, $L_2$, $L_3$ and $L_4$, respectively; $c_1$, $c_2$, $c_3$ and $c_4$ are the absorption coefficients for component $y$ at wave lengths $L_1$, $L_2$, $L_3$ and $L_4$, respectively; $d_1$, $d_2$, $d_3$ and $d_4$ are the absorption coefficients for component $z$ at wave lengths $L_1$, $L_2$, $L_3$ and $L_4$, respectively; and $k_1$, $k_2$, $k_3$ and $k_4$ are the absorption coefficients at wave lengths $L_1$, $L_2$, $L_3$ and $L_4$, respectively.

As is well known, equations of this type can be solved by systematically making approximations of the percentage of each component so that successive approximations approach the correct solution to the problem. These approximations are repeated until the difference in successive approximations becomes less than the experimental error of the original data. A decided limitation to this method of computation, however, is that considerable knowledge of mathematical procedure is required. While sets of linear simultaneous equations having fewer than four unknown quantities can readily be solved by elementary methods of elimination and substitution or through the use of determinants, for sets having more than four unknowns these calculations become extremely laborious and for all practical purposes are useless in industrial applications.

Thus, in order to use an infrared spectrophotometer as a tool for complex mixture analysis, it has become necessary to employ computing devices. The majority of computers presently available comprise a plurality of potentiometer networks having electrical voltages applied thereacross. The multiplications are performed by potentiometers connected in cascade relationship with one another, and the equalizing adjustments are performed by comparing the multiplication voltage sums against a plurality of reference voltages representing the constant terms of the equations. Operation of these computers is accomplished by inserting on appropriate potentiometers the values of the known quantities in each equation and adjusting hte potentiometers representing the unknowns to produce a balanced condition in the system which is represented by an equality of the voltages being compared. The unknowns of the equations are successively determined in this manner and the cycle is repeated until an ultimate value for each unknown fits all of the equations.

While these prior art computers have been effective in solving simultaneous linear equations, they have been quite expensive to construct because large numbers of precision potentiometers are required to establish voltages representative of the various terms. In accordance with the present invention an improved computer is provided which requires a minimum number of precision calibrated potentiometers. Precision calibrated potentiometers are used to establish the constant terms and the unknown terms. The potentiometers used to establish the known coefficients need not be calibrated. The coefficients are established by setting a desired value on the corresponding calibrated constant term potentiometer and adjusting the coefficient potentiometer until the two voltage drops are equal as evidenced by a zero deflection of a galvanometer connected therebetween. It has been found that commercially available non-calibrated potentiometers often have some resistance beyond the end stops. This makes it impossible to set low valued coefficients. However, the present invention incorporates small resistors in series with the calibrated constant term potentiometers to overcome this difficulty.

Accordingly, it is an object of the present invention to provide simplified apparatus for solving linear simultaneous equations.

A further object is to provide a system whereby coefficients can accurately be inserted in electrical computers without the use of precision potentiometers.

A still further object is to provide an electrical computer of simplified construction, employing a minimum number of precision circuit components, and which is easy to operate.

Figure 2:
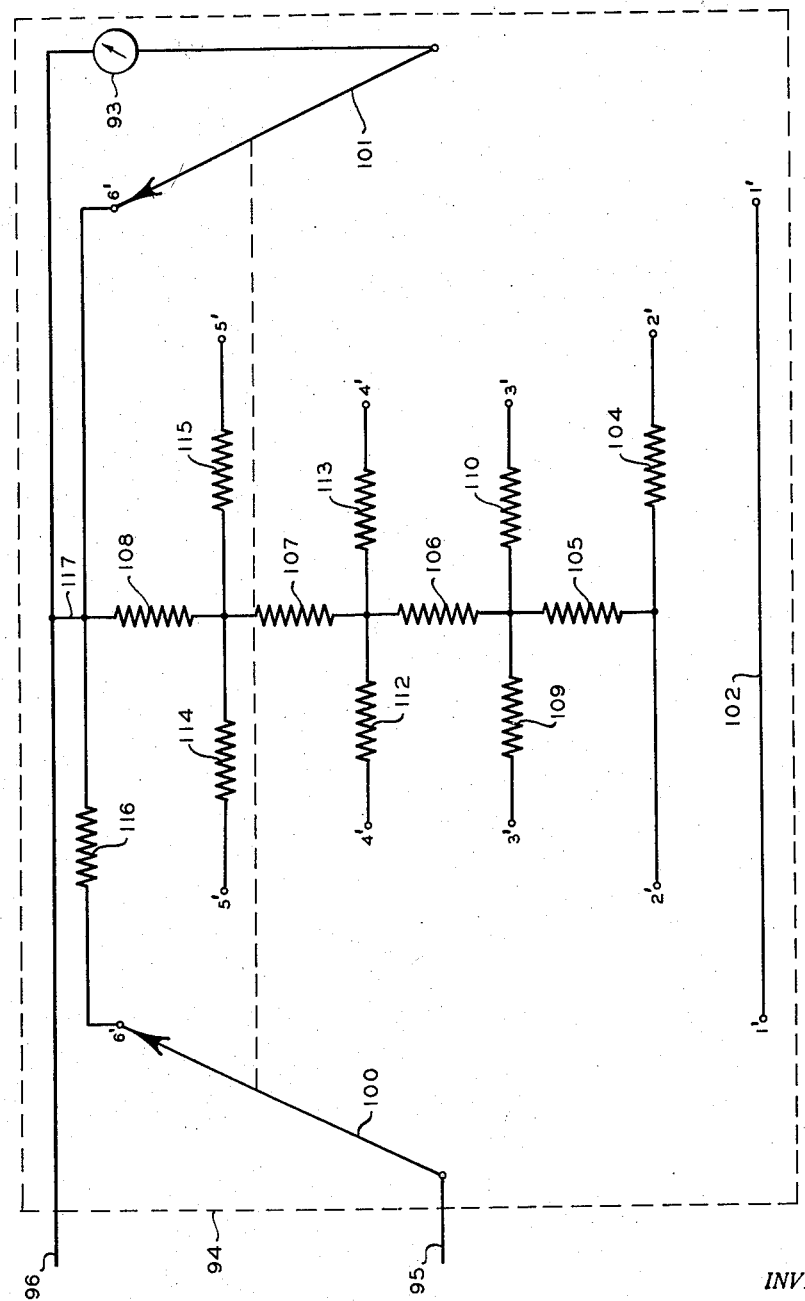

Other objects, advantages and features of this invention should become apparent from the following detailed description taken in conjunction with the accompanying drawing in which:

Figure 1 is a schematic electrical circuit diagram of a preferred embodiment of the computer adapted to solve sets of four linear simultaneous equations; and Figure 2 is a schematic circuit representation of the sensitivity control used in conjunction with the galvanometer of Figure 1.

Referring now to the drawing in detail and to Figure 1 in particular, there is shown a plurality of networks 10, 11, 12 and 13, each of which is adapted to provide voltages representative of corresponding coefficients in the set of equations being solved. Batteries 20, 30, 40 and 50 are included in networks 10, 11, 12 and 13, respectively. Four potentiometers $A_1$, $A_2$, $A_3$ and $A_4$ are connected in parallel relationship wtih one another by leads 21 and 22. Leads 21 and 22 are connected to battery 20 by a reversing switch 24 and a switch 25. Corresponding B, C and D potentiometers of networks 11, 12 and 13, respectively, are likewise connected in parallel relationship with the corresponding batteries in these networks, as illustrated. A network 15 is provided to establish voltages representing the constant terms in the equations. Potentiometers $K_1$, $K_2$, $K_3$ and $K_4$ are connected in parallel relationship with one another by leads 56 and 57. Lead 56 is connected by a resistor 58 to the first terminal of a battery 90. Lead 57 is connected by a resistor 59 and a switch 91 to the second terminal of battery 90. A resistor 92 is connected between lead 56 and switch 91. Switch 91 is mechanically coupled to switches 25, 35, 45 and 55 to turn off the instrument. The functions of resistors 58, 59 and 92 are described in detail hereinafter.

A plurality of potentiometers W, X, Y and Z are adapted to be connected selectively in cascade relationship with the respective individual potentiometers of networks 10, 11, 12 and 13 through ganged switching means 60. Switching means 60 comprises individual switches 61, 62, 63, 64 and 65 in networks 10, 11, 12, 13 and 15, respectively. One end terminal of potentiometer W is connected to lead 22 and the other end terminal is selectively connected through contacts 1, 2, 3 and 4 of switch 61 to the contactors of potentiometers $A_1$, $A_2$, $A_3$ and $A_4$, respectively. The contactor of potentiometer W is connected to switch 91. Potentiometers X, Y and Z are selectively connected by switches 62, 63 and 64 to networks 11, 12 and 13, respectively. One end terminal of potentiometer Z is connected through a galvanometer 93 and contacts 1, 2, 3 and 4 of switch 65 selectively to the contactors of potentiometers $K_1$ $K_2$, $K_3$ and $K_4$, respectively. The contactor of potentiometer Z is connected to the end terminal of potentiometer Y which is not connected to switch 63; the contactor of potentiometer Y is connected to the end terminal of potentiometer X which is not connected to switch 62; and the contactor of potentiometer X is connected to the end terminal of potentiometer W which is not connected to switch 91. It should thus be apparent that for any position of ganged switching means 60, the sum of the voltages appearing across networks 10, 11, 12 and 13 for a given equation is connected in opposition to corresponding reference voltage of network 15, and any difference between these two voltages is indicated by galvanometer 93.

Potentiometers W, X, Y, Z, $K_1$, $K_2$, $K_3$ and $K_4$ are precision instruments provided with scales 70, 71, 72, 73, 81, 82, 83, and 84, respectively, which serve to indicate the position of the contactors.

Galvanometer 93 is shown as being shunted by a network 94 which is illustrated in detail in Figure 2. Mechanically connected switches 100 and 101 are connected to lead 95 and to galvanometer 93, respectively. Movement of ganged switches 100 and 101 through respective contact points $1'$, $2'$, $3'$, $4'$, $5'$ and $6'$ serves to connect resistors having various values both in series and in shunt relationship with galvanometer 93, thereby modifying the sensitivity of the galvanometer to compensate for differences in potential applied across the terminals thereof. At position $1'$, galvanometer 93 is connected by a lead 102 directly between the voltages being compared, thereby giving a maximum reading for a given voltage difference. At position $2'$, a resistor 104 is connected in series with galvanometer 93 and resistors 105, 106 and 107 and 108 shunt the galvanometer. At position $3'$, a resistor 109 is in circuit with both the galvanometer and the shunt path of resistors 106, 107 and 108. A resistor 110 is in series with the galvanometer only. At position $4'$, the shunt path comprises resistors 107 and 108 and the galvanometer path includes a resistor 113. Both paths include a resistor 112. At position $5'$, both paths includes a resistor 114; the series path comprises a resistor 115; and the shunt path comprises resistor 108. At position $6'$, a resistor 116 is common to both paths and the galvanometer is shunted by a conductor 117. In a preferred embodiment of this galvanometer sensitivity device, resistors 104, 110, 113 and 115 each have 3,000 ohms resistance. Resistors 109, 112, 114 and 116 each are 500 ohms. Resistor 105 is 400 ohms; resistor 106 is 47 ohms; resistor 107 is 10 ohms; and resistor 108 is 2 ohms. Thus, it can be seen that the sensitivity of galvanometer 93 is progressively increased as ganged switches 100 and 101 are moved from contact points $6'$ to contact points $1'$.

In order to explain the operation of the present computer let it be assumed that the equations are arranged so that $a_1$ is numerically greater than $b_1$, $c_1$ or $d_1$; and so that $b_2$, $c_3$ and $d_4$ also are maximum coefficients in their respective equations. For convenience each equation is divided through by its maximum coefficient leaving:

$$\frac{a_1}{a_1}w+\frac{b_1}{a_1}x+\frac{c_1}{a_1}y+\frac{d_1}{a_1}z=\frac{k_1}{a_1}$$
$$\frac{a_2}{b_2}w+\frac{b_2}{b_2}x+\frac{c_2}{b_2}y+\frac{d_2}{b_2}z=\frac{k_2}{b_2}$$
$$\frac{a_3}{c_3}w+\frac{b_3}{c_3}x+\frac{c_3}{c_3}y+\frac{d_3}{c_3}z=\frac{k_3}{c_3}$$
$$\frac{a_4}{d_4}w+\frac{b_4}{d_4}x+\frac{c_4}{d_4}y+\frac{d_4}{d_4}z=\frac{k_4}{d_4} \qquad (2)$$

which by an obvious substitution of terms can be rewritten as:

$$A_1w+B_1x+C_1y+D_1z=K_1$$
$$A_2w+B_2x+C_2y+D_2z=K_2 \qquad (3)$$
$$A_3w+B_3x+C_3y+D_3z=K_3$$
$$A_4w+B_4x+C_4y+D_4z=K_4$$

The purpose of dividing each equation by its maximum coefficient is to express the coefficients as fractions equal to or less than unity in order to facilitate setting the coefficients on the respective potentiometers. The solution to this last set of equations will now be described in detail.

The first step in the solution is to insert the values of the various coefficients on their respective potentiometers, this being accomplished in the following manner. In order to set the numerical value of $A_1$ on potentiometer $A_1$, the contactors of potentiometer W is set at position 100; switch 60 is positioned on contact point 1; the contactors of potentiometers X, Y and Z are each set at zero; and switch 24 is set so that the positive terminals of batteries 20 and 90 buck one another. The position of the contactor of potentiometer $K_1$ is set to the numerical value of 100 times the percent value of coefficient $A_1$. The position of the contactor of potentiometer $A_1$ is then moved until a zero deflection is obtained on galvanometer 93, thereby indicating that the voltage drop across potentiometer $K_1$ is equal to the voltage drop taken across potentiometer $A_1$, which establishes a numerical setting for potentiometer $A_1$. Switch 60 is then moved to contact position 2 and the procedure is repeated with respect to potentiometers $A_2$ and $K_2$ to establish the setting of potentiometer $A_2$. Potentiometers $A_3$ and $A_4$ are then set in a similar manner. In order to set the values on potentiometers $B_1$, $B_2$, $B_3$ and $B_4$, the contactor of potentiometer X is set at 100 and the contactors of potentiometers W, Y and Z are each set at zero. The balancing procedure is repeated in the same manner as for the A potentiometers. The numerical values of constants $K_1$, $K_2$, $K_3$ and $K_4$ are set directly upon their corresponding potentiometers in network 15.

As previously mentioned, commercially available non-calibrated potentiometers often have end resistance beyond the stop points of the contactors. This makes it impossible to set low values on the A, B, C and D potentiometers. If the $K_1$ potentiometer is set at zero, for example, in the absence of resistor 59, the potential at the contactor is zero. It is impossible to obtain a balance by setting the contactor of potentiometer $A_1$ at the lower end stop if there is a residual resistance beyond that point. To overcome this difficulty, resistor 59 is inserted in series with potentiometers $K_1$, $K_2$, $K_3$ and $K_4$. The value of this resistor is small compared with the potentiometer resistances. In the above-described embodiment of this invention, resistor 59 was ten ohms, potentiometers K were each 5,000 ohms, and potentiometers A, B, C and D were each 2,000 ohms. Resistor 59 thus compensates for any end resistance in potentiometers A, B, C and D so that a balance can be obtained in setting low values. Resistor 58 serves the same purpose to balance the high end of the potentiometers, depending upon the relative values of the various batteries and potentiometers. A 300 ohm resistor 92 is connected in parallel with the K potentiometers so that battery 91 will be drained at approximately the same rate as the other batteries.

Having thus calibrated the potentiometer, the solution to the set of Equations 3 for the unknown values $w$, $x$, $y$ and $z$ is made in the following manner. Ganged switch 60 is moved to contact points 1 and the contactor of potentiometer W is adjusted until a zero deflection is obtained on galvanometer 93, which may necessitate a reversal of switch 24 to obtain a balance if the unknown quantity has a negative value. Ganged switch 60 is then moved to contact points 2 and the contactor of potentiometer X is adjusted until a zero deflection is once again obtained on galvanometer 93. Potentiometers Y and Z are adjusted in like manner with the ganged switch 60 being on contact points 3 and 4, respectively; and the entire process is repeated until no further adjustment is necessary to realize a zero galvanometer deflection at each position. Numerical solutions for the unknowns $w$, $x$, $y$ and $z$ are obtained directly from the position of the contactors of the respective potentiometers on scales 70, 71, 72 and 73. Each time a reading is taken on galvanometer 93, ganged switches 100 and 101 should first be positioned on contact points 6' and progressively moved toward contact points 1' as a final balance position is approached. For maximum sensitivity the final readings should be taken at contact points 1 so that maximum current flows through galvanometer 93.

Although a four equation system has been chosen to illustrate this invention, it should be apparent that the invention is in no way limited to solution of sets of four simultaneous equations. Satisfactory results have been obtained in computers adapted to solve sets of ten equations, although it again should be obvious that the invention is not limited to this number, but rather is capable of solving any number of equations which may be presented. For example, if a set of five equations is to be solved, a new E network is added having potentiometers $E_1$, $E_2$, $E_3$, $E_4$ and $E_5$ and a calibrated potentiometer Z', corresponding to the W, X, Y and Z potentiometers. Each of the existing networks 10, 11, 12, 13 and 15 has an additional potentiometer such as $A_5$, $B_5$, $C_5$, $D_5$ and $K_5$, and switch 60 has additional contact points 5. If a larger number of equations are presented, additional networks and potentiometers are added in a similar manner. It also should be observed that the invention is capable of solving any set of linear simultaneous equations and is in no way restricted to applications in the field of infrared analysis. The computer of this invention is capable of solving many systems of equations which are not initially convergent, but which can be made convergent by multiplying and combining individual equations, as is well known to those skilled in the art. Other industrial applications for this computer involve analysis by a mass spectrometer and the computation of components for metallic alloys.

While this invention has been described in conjunction with a present preferred embodiment, the specification should be considered as descriptive rather than by way of limitation.

What is claimed is:

1. A computer for solving simultaneous equations comprising a plurality of electrical networks, each network comprising a plurality of first potentiometers connected in parallel relationship with one another, a second potentiometer, and switching means to selectively connect said second potentiometer in cascade relationship with individual ones of said first potentiometers so that one end terminal of said second potentiometer is connected to one end terminal of one of said first potentiometers and the second end terminal of said second potentiometer is connected to the contactor of one of said first potentiometers; a plurality of third potentiometers; means applying voltages across the first potentiometers in each of said networks; a first resistor having one terminal connected to first end terminals of said third potentiometers; a second resistor having one terminal connected to second end terminals of said third potentiometers; means applying a voltage between the second terminals of said first and second resistors; means to sum the voltages between the contactors and first end terminals of the second potentiometers in each of said networks; and means to compare said summed voltage with the voltage between the contactors of selective ones of said third potentiometers and the second terminal of said first resistor.

2. A computer for solving simultaneous equations comprising a plurality of electrical networks, each network comprising a plurality of first potentiometers connected in parallel relationship, a first voltage source, a reversing switch to connect said first voltage source across said first potentiometers, a second potentiometer having the first end terminal thereof connected to first end terminals of said first potentiometers, a first switch to connect the second end terminal of said second potentiometer selectively to the contactors of said first potentiometers; a plurality of third poteniometers connected in parallel relationship; a first resistor having the first terminal thereof connected to the first end terminals of said third potentiometers; a second voltage source connected between the second terminal of said first resistor and the second end terminals of said third potentiometers; means for connecting the first end terminals of the second potentiometers in all but one of said networks to the contactors of second potentiometers in adjacent networks, respectively; a second switch adapted to be connected to the contactors of said third potentiometers selectively; first means, including the first-said means, for connecting said second switch to the first end terminal of said second potentiometer in said one network; second means for connecting the second terminal of said first resistor to the contactor of the second potentiometer not otherwise connected; and current indicating means included in one of said first and second means.

3. The combination in accordance with claim 2 wherein said second and third potentiometers are provided with calibrated scales.

4. A computer for solving simultaneous equations comprising a plurality of electrical networks, each network comprising a plurality of first potentiometers connected in parallel relationship, a first voltage source, a reversing switch to connect said first voltage source across said first potentiometers, a second potentiometer having the first end terminal thereof connected to first end terminals of said first potentiometers, a first switch to connect the second end terminal of said second potentiometer selectively to the contactors of said first potentiometers; a plurality of third potentiometers connected in parallel relationship; a first resistor having the first terminal thereof connected to the first end terminals of said third potentiometers; a second resistor having the first terminal thereof connected to the second end terminals of said third potentiometers; a second voltage source connected between the second terminals of said first and second resistors; means for connecting the first end terminals of the second potentiometers in all but one of said networks to the contactors of second potentiometers in adjacent networks, respectively; a second switch adapted to be connected to the contactors of said third potentiometers selectively; first means, including the first-said means, for connecting said second switch to the first end terminal of said second potentiometer in said one network; second means for connecting the second terminal of said first resistor to the contactor of the second potentiometer not otherwise connected; and current indicating means included in one of said first and second means.

References Cited in the file of this patent

UNITED STATES PATENTS

| | | |
|---|---|---|
| 2,103,636 | Pearson | Dec. 28, 1937 |
| 2,468,150 | Wilcox | Apr. 26, 1949 |
| 2,469,465 | Hamilton et al. | May 10, 1949 |
| 2,584,809 | Oberlin | Feb. 5, 1952 |
| 2,777,114 | Lowe | Jan. 8, 1957 |
| 2,780,776 | Goeppinger et al. | Feb. 5, 1957 |
| 2,803,399 | Morgan et al. | Aug. 20, 1957 |